United States Patent [19]

Provost et al.

[11] Patent Number: 4,984,339
[45] Date of Patent: Jan. 15, 1991

[54] HOOK FOR HOOK AND LOOP FASTENERS

[75] Inventors: George A. Provost, Manchester; Gerald F. Rocha, Bedford, both of N.H.

[73] Assignee: Velcro Industries B.V., Amsterdam, Netherlands

[21] Appl. No.: 260,474

[22] Filed: Oct. 20, 1988

[51] Int. Cl.⁵ ............................................. A44B 18/00
[52] U.S. Cl. ......................................... 24/452; 24/442
[58] Field of Search ................. 24/452, 450, 449, 442, 24/448, 451; 428/100

[56] References Cited

U.S. PATENT DOCUMENTS

| | | | |
|---|---|---|---|
| 3,031,730 | 5/1962 | Morin | 24/452 X |
| 3,147,528 | 9/1964 | Erb | |
| 3,312,583 | 4/1967 | Rochlis | |
| 3,546,754 | 12/1970 | Erb | 24/450 |
| 3,708,833 | 1/1973 | Ribish et al. | |
| 3,762,000 | 10/1973 | Menzin et al. | |
| 3,913,183 | 10/1975 | Brumlik | 24/449 X |
| 4,330,907 | 5/1982 | Ochiai | 24/449 X |
| 4,654,246 | 3/1987 | Provost et al. | 428/100 X |
| 4,725,221 | 2/1988 | Blanz | 24/452 X |
| 4,794,028 | 12/1988 | Fischer | 24/442 X |

FOREIGN PATENT DOCUMENTS 2929329  2/1981 Fed. Rep. of Germany ........ 24/452
WO87/06522 11/1987 PCT Int'l Appl. .

Primary Examiner—James R. Brittain
Attorney, Agent, or Firm—Hayes, Soloway, Hennessey & Hage

[57] ABSTRACT

An improved hook for hook and loop fasteners having a profile defined by an inner smoothly contoured generally concave face and an outer generally convex face, said hook comprising a sturdy base intimately engaging a substantially planar base member and extending therefrom to join a resilient hook portion, able to engage a loop applying a force to the hook portion substantially normal to the base member, terminating in a free end, wherein the hook tapers smoothly and continuously downwardly in width from the sturdy base member to the free end such that a loop engaging the hook in tension, with the applied force being substantially normal to the base member, will deform the hook portion resiliently under the applied force to release the loop at a desired applied force and such that a loop engaging the hook in shear, with the applied force substantially parallel to the base member, will engage the sturdy base member, the sturdy base member being sufficiently sturdy that it will not deform to release a loop engaging the hook in shear at or below the desired applied force.

28 Claims, 7 Drawing Sheets

HOOK FOR HOOK AND LOOP FASTENERS

This invention relates to an improved hook for hook and loop fasteners and particularly, though not exclusively, to such hooks integrally molded with a base strip and having a cross-section with a shape to facilitate removal from an open-ended but otherwise closed mold cavity as the base strip is peeled from the periphery of a roller having said cavities formed in the periphery thereof and to provide high shear strength for the fastener coupled with desired relatively low hook height, satisfactory separability performance for the fastener in peel, appropriate automatic positioning of a loop engaging the hook for operation in tension and in shear, superior engagement of the loop with the hook for operation in shear, low lint pickup during washing and superior anti-snagging properties and reduced surface abrasion of adjacent fabric surfaces all relative to prior art hook and loop fastener hooks.

The technology for hook and loop fasteners is well established, however, this conventional technology has limitations which restrict performance. With consideration for these limitations, the hook of the present invention has been developed to optimize hook geometry and thus improve performance.

Typically hook and loop fasteners derive their fastening ability from the mechanical engagement of hooking elements with yarn filaments anchored at both ends in a base material. The conventional construction for the hook portion of such a fastener involves inverted "J" shaped protrusions of uniform cross-section extending perpendicularly from a base member. This structure is typically achieved by weaving or knitting synthetic monofilament yarns into a base ribbon.

As a fastener, the hook and loop closure is subjected to various types of stresses. Opposing loads applied perpendicular to the faces of the hook and loop elements are identified as tension forces. Opposing loads applied parallel to and in the same plane as the faces are shear forces. Those required to disengage the elements are peel forces. FIG. 1 illustrates a conventional hook and indicates the location and direction of these forces.

FIG. 2 depicts the typical deformation that a conventional hook experiences under peel and shear loads respectively. The strength of the fastener under these type loadings is directly proportional to the hook's resistance to deformation. For conventional monofilamenting hooks this can be only altered by varying the monofilament diameter or resin. These modifications are limited in scope and can be more detrimental than beneficial on performance.

Because of mechanical limitations in producing the monofilament hook, its minimum height typically is restricted to 0.070+/−0.005". When shear loads are applied to this hook configuration deformation causes the loop filament applying the force to slide up the hook shank increasing the length of the moment arm which results in greater deformation causing further slippage and subsequently a longer moment arm. Ultimately the filament slips off the hook end.

Basically the same type of failure occurs when peel or tension loads T are applied as shown in FIG. 2.

Attempts have been made in the past to produce molded hooks integrally formed with a base strip. Generally these have varied in configuration either to meet specific manufacturing criteria (e.g. MENZIN U.S. Pat. No. 3,762,000) or have been shaped to imitate the well-known monofilament hook shown in FIG. 1. (e.g. ERBS U.S. Pat. No. 3,147,528).

U.S. Pat. No. 3,760,000 to Menzin et al., disclose a hook "eye" having a sloping surface which functions as a cam surface during the extracting of the hooks from the mold cavities. The shank portion has two equally dimensioned flat sides and a somewhat larger third side. The shank portion is larger in cross section near the web than at the tip of the hook. The three flat side portions of the shank are continued in smooth curves into and throughout the hook portion. The shank portion of the third side lies in the same continuous plane as the corresponding face of hook portion.

Several other disclosures in the prior art such as U.S. Pat. Nos. 3,312,583 (Rochlis) and 3,708,833 (Ribich) describe hooks having somewhat tapered shapes. None of these embodiments, however, discuss the unique structure of the present invention or provide the advantages achieved by the present invention.

A more recent arrangement (see i.e. PCT/U.S. No. 86/01367 published Nov. 5, 1987) proposes the integral molding of hooks and base strip using a molding roller having hook shaped open ended non-openable cavities extending into the periphery thereof with the hooks molded therein being pulled longitudinally from the cavities as the base strip is peeled away from the roller. This PCT application discusses a variety of single and double hook configurations primarily directed at shapes that will facilitate withdrawal of the hooks from the open ended molds formed in the sides of a plurality of discs, at the perimeter thereof, that form the molding roller.

A first of these has a base member having a typical hook-type engaging element, upstanding from one surface thereof, formed of an upstanding stem which is preferably tapered and which includes an arcuately configured inner surface. On the unsupported end of the stem there is connected a radial extension which extends away from the stem and is resiliently flexible relative to the stem.

The stem is tapered from the base to its unsupported end. The radial extension flexes mechanically and resiliently relative to the stem when the fastener members are pressed together or peeled apart thus permitting the relative peeling of the fastener members. Whenever shear forces are applied to the two members, these forces cause further engagement between the loop and the hook by translation of downward forces on the loop thereby causing the loop to ride downwardly along the arcuate surface of the hook. Thus, it will be appreciated that the configuration of the hook with its unique arcuate inner surface portion, assists in directing any loops engaged therewith toward a predetermined portion of the stem, in this case, the medial portion of the stem which is the portion of greatest strength.

This PCT application points out that by carefully and precisely dimensioning the stem of each hook in its cross-section and its arcuate side portion, the strength of the stem in the fastener shear mode can be increased or decreased depending upon its cross-sectional area, and consequently to adjust its strength in shear. In particular, it is stated that since the arcuate portion of the stem will normally direct the loop or loops to a predetermined portion when in shear, it will be observed that the strength of the fastener in shear can be predetermined by carefully selecting the cross-sectional area of the stem, not only at its base but at its medial section, i.e. the section which will receive the hook or loops when they slide along the arcuate stem portion when the fastener is in the shear mode.

A second hook of this PCT application is tapered and has arcuate inner and outer surfaces to facilitate the predetermination of the shear strength capability of the hook.

The stem of this embodiment is connected to the base member by arcuate reinforcing transitions. These hook designs are all part circular, is cross-sectional and may able to be provided with a taper not only in width but also in thickness.

It is an object of the present invention to provide an improved molded hook shaped to provide superior performance to prior art molded hooks in hook and loop fasteners while facilitating economical production.

It is a further object of the present invention to provide a hook shape for hook and loop fasteners which minimizes lint pick-up and snagging while maximizing the grip of the loop on the hook together with desired performance in peel coupled with desired performance in shear.

According to the present invention there is provided an improved hook for hook and loop fasteners having a profile defined by an inner generally concave face and an outer generally convex face, said hook comprising a steeply tapered base portion intimately engaging a planar base member and extending therefrom. The tapered base portion joins, in a transition region, a hook portion able to engage a loop in the hook tapering continuously downwardly in width from the base member to the free end. A loop engaging the hook in tension, with the said force being substantially normal to the base member, will cause a buckling of the hook at a location adjacent the outer face in the transition region as the hook deforms under the applied force. A loop engaging the hook in shear, with said force substantially parallel to the base member, will transmit the shear force through the hook at a point between the location of buckling and the base member. Thus the shear force is transmitted through the steeply tapered (much stronger) base portion.

The invention will now be described, by way of example, with reference to the accompanying drawings, in which:

FIGS. 1, and 2, illustrate a prior art monofilament hook and its operation;

FIGS. 3 and 4 illustrate two types of hooks illustrated in the PCT application and FIG. 5 illustrates a hook of the type shown in Rochlis U.S. Pat. No. 3,312,583.

Figure 1:
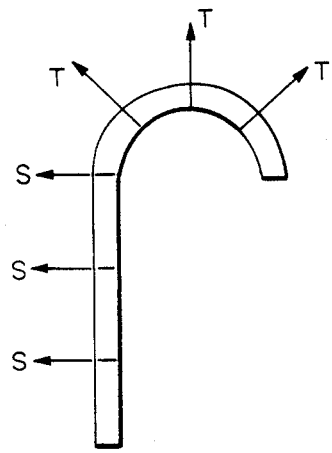
Figure 2:
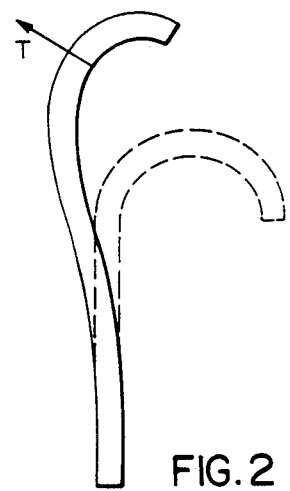
Figure 3:
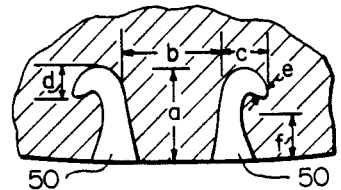
Figure 4:
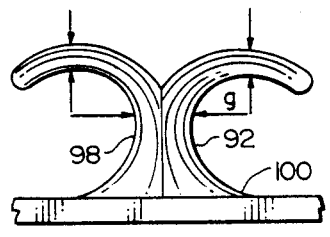
Figure 5:
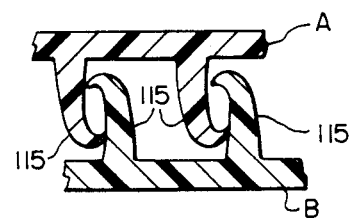
Figure 6:
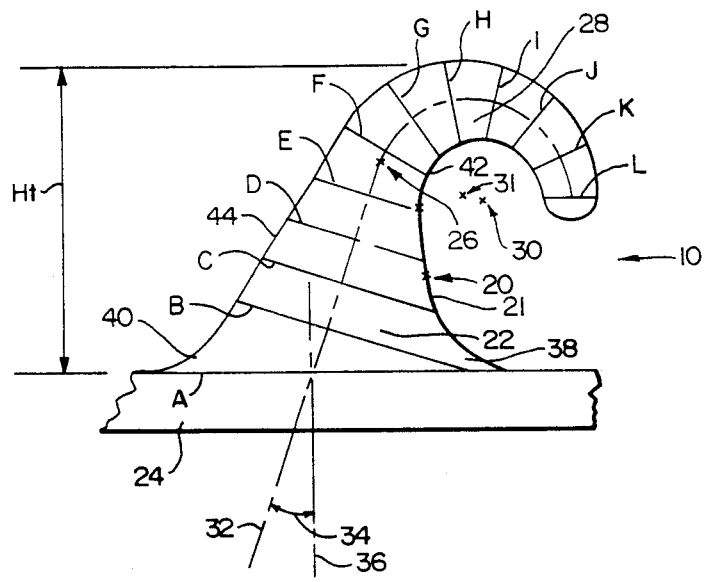
FIG. 6 is a side elevation of a preferred shape of hook according to the present invention.
Figure 8:
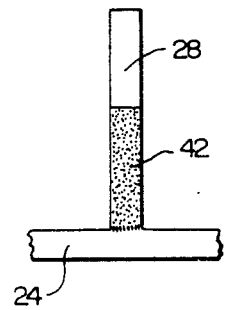
Figure 9:
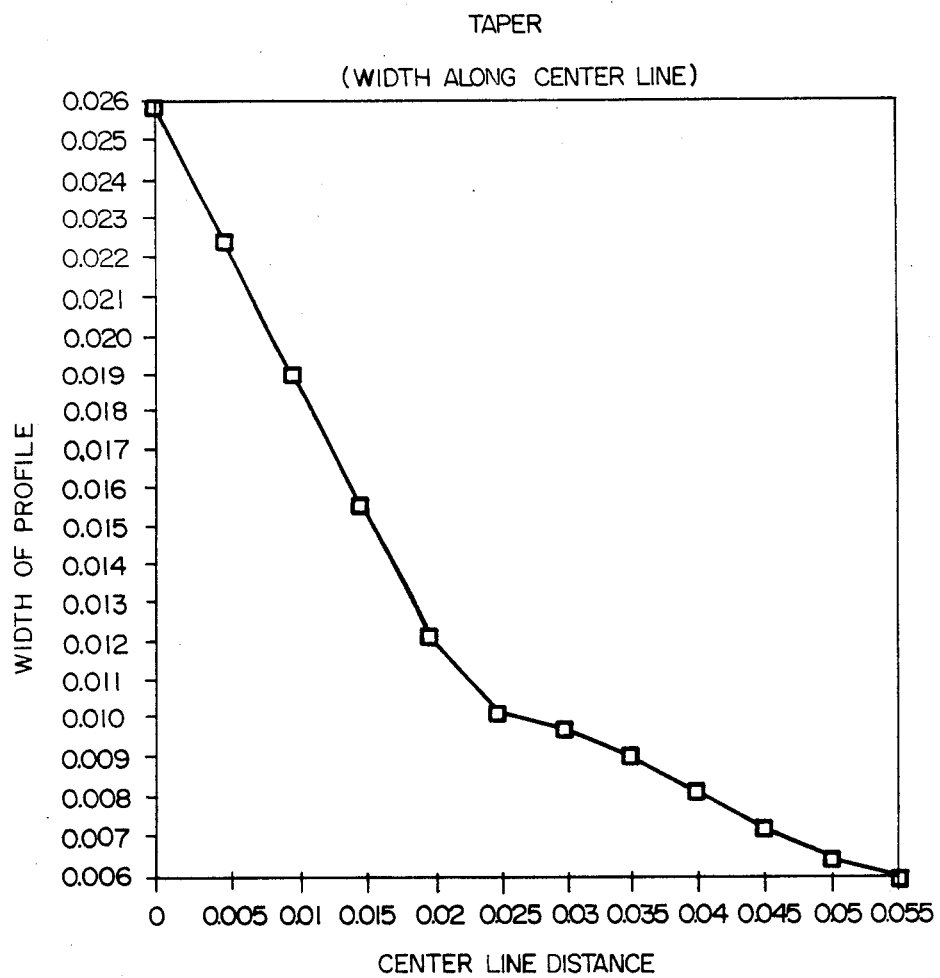
Figure 10:
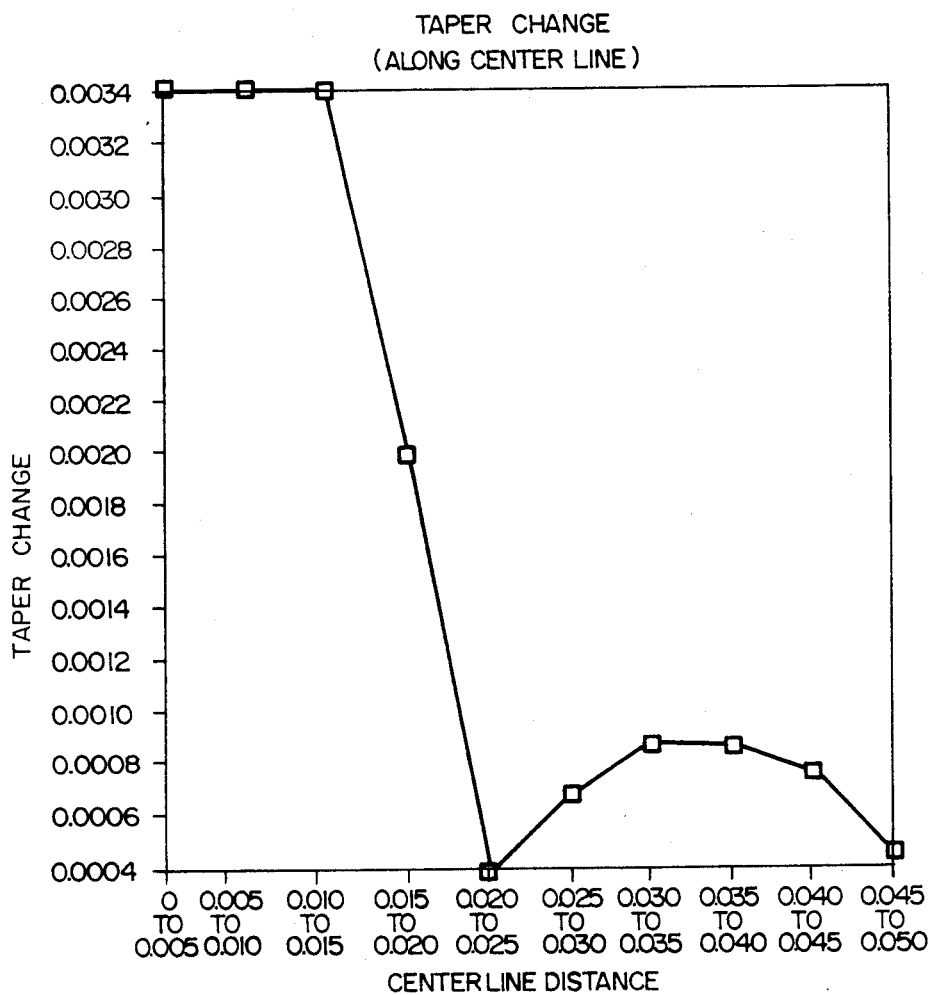
Figure 17:
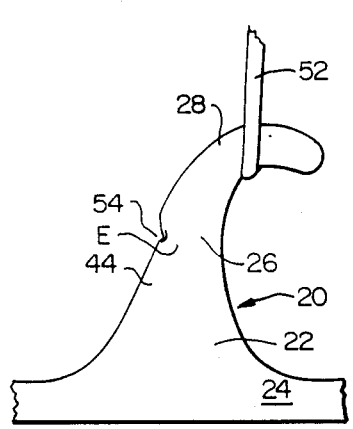
Figure 18:
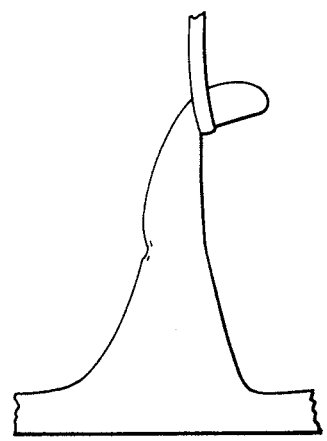
Figure 19:
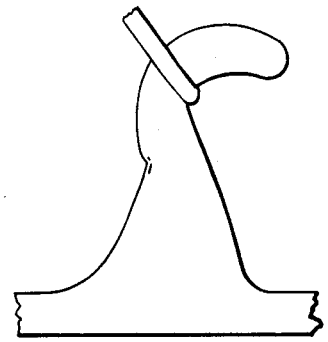
Figure 20:
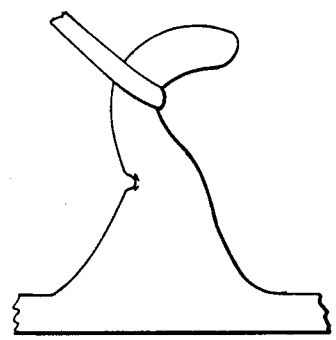
Figure 21:
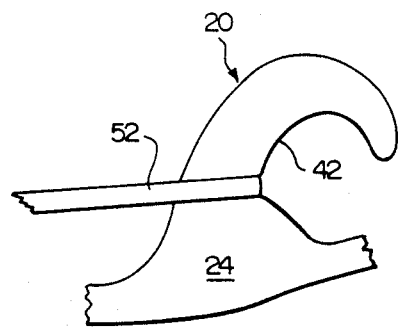
Figure 22:
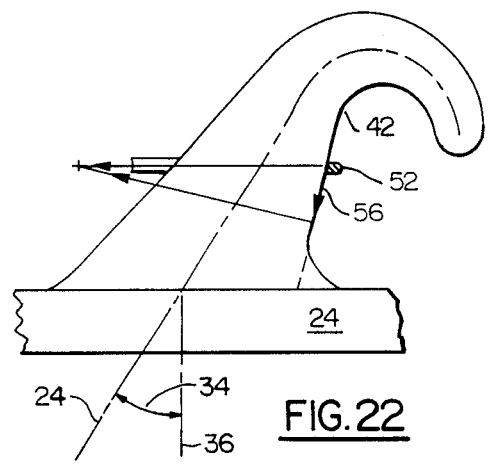
Figure 23:
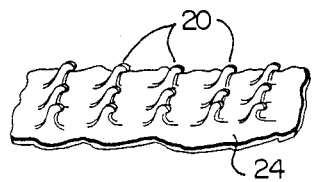
Figure 24:
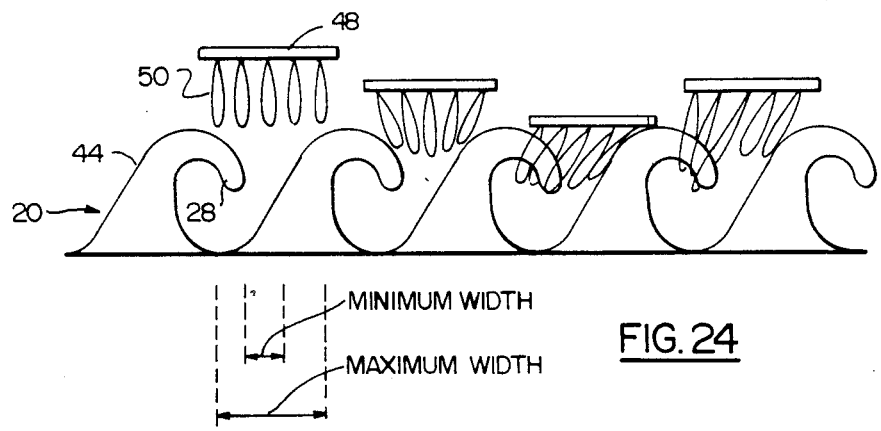
Figure 25:
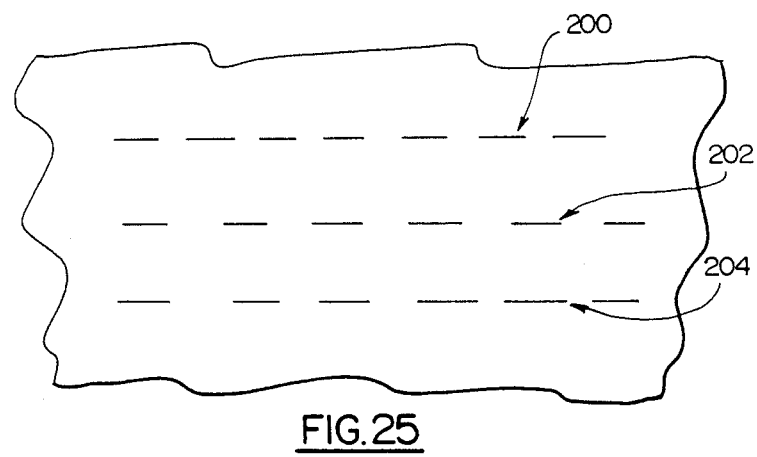

FIG. 8 a front elevation of the hook of FIG. 6 as seen in the direction of arrow 10 in FIG. 6;

FIG. 9 is a graphical representation of the continuous taper of the hook of FIG. 6;

FIG. 10 is a graphical representation of the change of taper of the hook of FIG. 6;

FIGS. 11 through 16 illustrate the removal of the hook of FIG. 6 from an open-ended cavity in the periphery of a molding roller as a base member of hook material, by which a plurality of the hooks are supported, is peeled from the roller surface;

FIGS. 17 and 18 illustrate the deformation under medium and near release loads by a loop engaging the hook of FIG. 6 in tension;

FIGS. 19 and 20 illustrate the deformation under medium and near release loads by a loop engaging the hook of FIG. 6 angled toward shear operation but still operating substantially in tension;

FIG. 21 illustrates the hook of FIG. 6 when engaged by a loop and loaded in shear;

FIG. 22 is a side elevation of a second embodiment of hook according to the present invention;

FIG. 23 is a diagrammatic representation of a hook material having many hooks of the present invention all facing in one direction to provide one way operation in shear and norm operation in tension; and FIG. 24 shows a hook and loop assembly embodying the invention.

Figure 7:
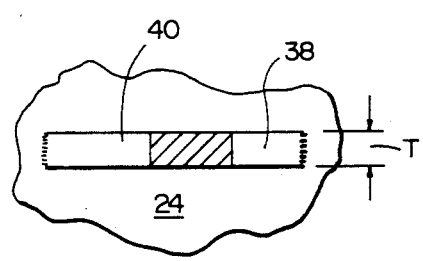
FIG. 7 is a typical cross-section of the hook of FIG. 6.

Referring now to FIG. 6, 7 or 8 the hook of the present invention is shown generally by reference numeral 20. Hook 20 has a rectangular cross-section (FIG. 7) with a thickness of about 0.012 inches and is integral at its base 22 with a planar base member 24 having a thickness of about 0.010 inches. As can be seen by examination of FIG. 6 the inner and outer faces of the hook at the base portion are steeply tapered towards each other with an angle of about 35°. This angle should be preferably at least 25°.

Hook 20 comprises a sturdy monolithic base 22 extending from planar base member 24 to a transition region 26 in which occurs a significant change of taper of the inner (front) face 21 with respect to the back face 44, with a transition to a generally arcuate resilient hook portion 28 with an inner face which arcs about center curvature 30 through an angle of about 160°. The outer face is essentially straight to the point F where transition to an arcurate surface occurs having a center of curvature 31 which is closer to the stem than is the center of curvature 30. The center of area of the base 22 and transition region 26 defines an axis 32 disposed at an angle 34 of about 17.5° to a line 36 normal to the planar base member. In various embodiments of the present invention this angle may be from about 15° to about 35° and preferably from about 17.5° to about 30° with about 17.5° being the best mode known to applicant at the present time. In the preferred form of tapered base shown, the front (21) to rear (44) thickness of the tapered base, as measured in FIG. 6 normal to the center of area axis is much (about 2 times) greater than the transverse thickness of the base of the point of attachment to the planar base member 24. This front (21) to rear (44) thickness rapidly decreases to the transition region where the front to rear thickness is about equal to, or slightly less than, the transverse thickness of the hook portion. This front to rear thickness then changes very slightly to the end of the hook.

It will be appreciated that the transition region is short relative to the height of the base and length of the hook portion and may be considered for the purposes of hook performance to have substantially zero length.

The base 22 in side elevation includes concave reinforcing fillets 38,40 providing a smooth transition with the base member 24 and buttressing support for the base.

Inner smoothly contoured generally concave face 42 is preferably textured at least in part as if sandblasted with 400 grit abrasive material, preferably an RMS of about 18 to 35, more preferably an RMS of about 20 to 30, to enhance frictional engagement of the hook 20 with a loop of a cooperating loop carrying member of a hook and loop fastener. Texturing to an RMS below about 18 RMS generally does not enhance frictional engagement significantly, while texturing to an RMS above about 35 generally is avoided since this increases loop wear and breakage upon disengagement.

The rectangular cross-section of the hook also aids the gripping of the hook by a loop as the loop bites into the corners of the rectangular cross section adjacent the textured surface.

Hook height Ht is 0.050 inches±0.002 inches and the hook's width tapers smoothly and continuously to provide a thickness normal to center of area axis 32 and its curved extension axis defined by the center of area of the hook portion 28 indicated in FIG. 6 by reference characters A through L (ignoring Fillets 38,40) as follows:

TABLE I

| LOCATION | DISTANCE ALONG CENTER OF AREA FROM BASE (INCHES) | WIDTH NORMAL TO CENTER OF AREA AXIS |
|---|---|---|
| B | 0.005 | about 0.0264 |
| C | 0.010 | about 0.0190 |
| D | 0.015 | about 0.0156 |
| E | 0.020 | about 0.0122 |
| F | 0.025 | about 0.0102 |
| G | 0.030 | about 0.0098 |
| H | 0.035 | about 0.0091 |
| I | 0.040 | about 0.0082 |
| J | 0.045 | about 0.0073 |
| K | 0.050 | about 0.0065 |
| L | 0.055 | about 0.0060 |

Table I is graphically presented as FIG. 9.

The degree of taper is important in design considerations and the following Table II presents the considerations and the following Table II presents the degree of taper in inches for each 0.005" step along the center of area axis, again ignoring fillets 38,40:

TABLE II

| LOCATION OF STEP | MAGNITUDE OF TAPER |
|---|---|
| B-C | 0.0074 in 0.005 |
| C-D | 0.0034 in 0.005 |
| D-E | 0.0034 in 0.005 |
| E-F | 0.0020 in 0.005 |
| F-G | 0.0004 in 0.005 |
| G-H | 0.0007 in 0.005 |
| H-I | 0.0009 in 0.005 |
| I-J | 0.0009 in 0.005 |
| J-K | 0.0008 in 0.005 |
| K-L | 0.0005 in 0.005 |

Table II is graphically presented as FIG. 10. Hook 6 also defines an at least partly convex, preferably smoothly contoured, outer face 44. As can be readily seen from FIG. 6, the portion of the inner face 42 adjacent the transition area is substantially straight and is inclined at an angle of about 5° oppositely to the inclination of the center of area axis 32 relative to the line 36 normal to the base member 24. Naturally this angle will vary with the degree of taper used and the inclination of the center area axis 32 and may be oppositely inclined as discussed below with reference to FIG. 22. In discussing the degree of taper in connection with the preferred embodiment of FIG. 6 it is noted that major portions of the front (21) and rear (44) surfaces of the base are largely straight lines. When these lines are curved the degree of taper can be estimated by using major chords extending from the planar base 24 to the transition point where the steep taper changes to the curved hook with slight taper.

One important aspect of the present invention is the provision of a smoothly and continuously tapered hook shape which is shaped and dimensioned to be readily pulled from an open ended but otherwise closed hook shaped cavity when partially solidified without unacceptable permanent hook deformation occurring. The above defined shape achieves this and FIGS. 11 through 16 illustrate this removal process step-by-step.

Figure 11:
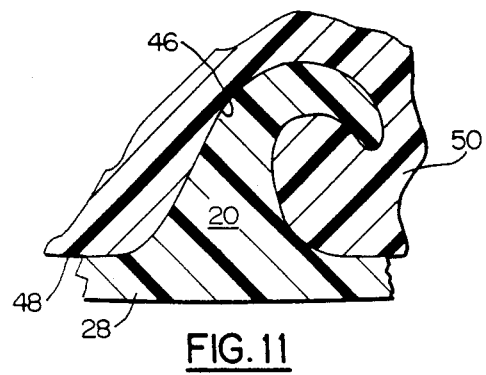
Figure 12:
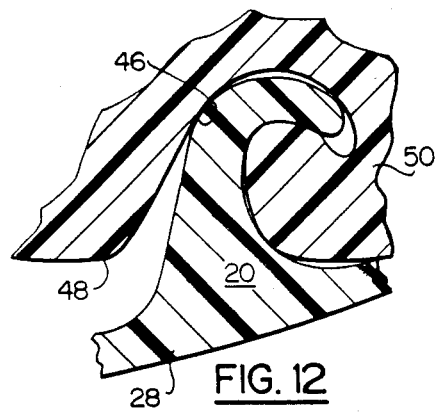
Figure 13:
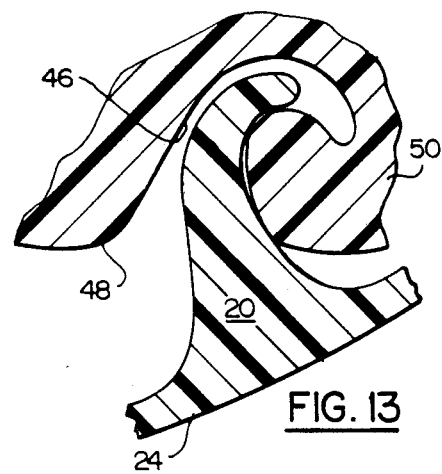
Figure 14:
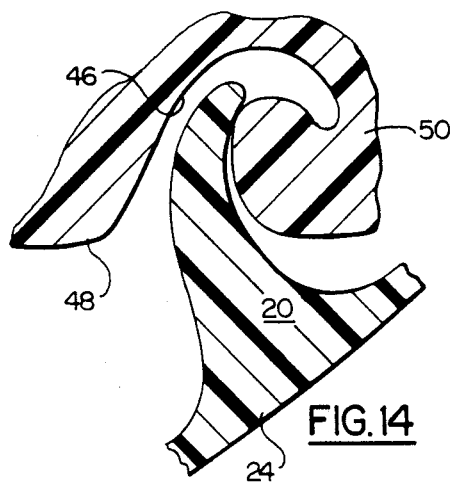
Figure 15:
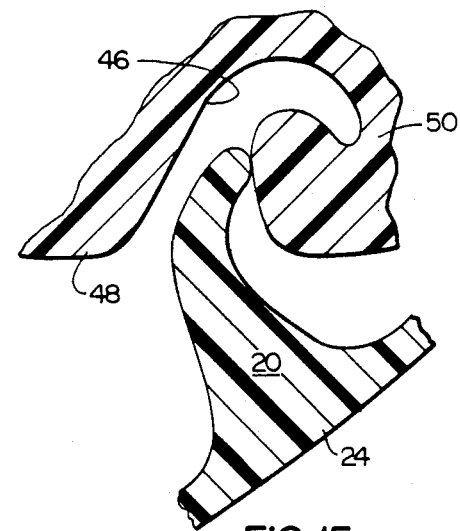
Figure 16:
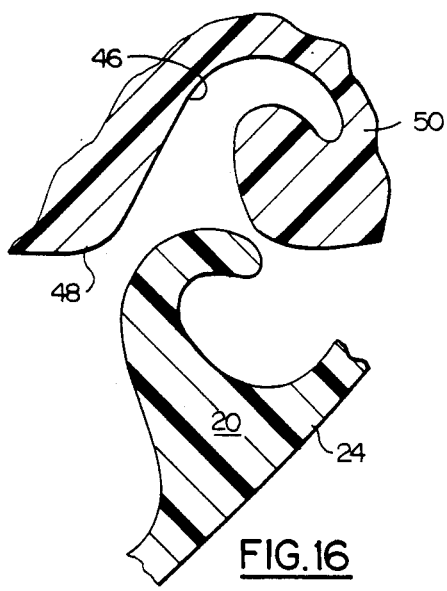

FIG. 11 shows a hook 20 filling a hook cavity 46 in the periphery 48 of a molding roller 50 with base member 24 in contact with the periphery 48. Once the hook (and base member) has cooled sufficiently to retain its shape without the aid of the cavity and to be sufficiently resilient to return to its desired shape after being pulled longitudinally from the mold while still being flexible enough to permit such removal without destructive stresses being reached in the hook, the base member is pulled progressively away from the periphery of the molding roll and the hook is pulled progressively from the mold as shown sequentially in FIGS. 12 through 15 until it clears the cavity and springs back to its desired shape as shown in FIG. 16.

Review of FIGS. 12 through 15 will show how the choice of taper of the hook and the concave shape of the fillets coupled with the generally arcuate shape of the hook portion contribute to providing removal easing clearances facilitating the removal of the hook with minimal stressing of the hook material during that removal.

The texturing of the inner surface 2 of the hook may be achieved by corresponding texturing of the respective surface of the cavity.

FIGS. 17 through 21 show the hook 20 in use under various types and degrees of stress. In FIG. 17 the hook is under tension by a loop 52 applying a load to the resilient hook portion 28 normal to base member 24. Here the load is within the usual operating range encountered in use below that required to peel a hook and loop fastener apart. As can be seen at 54 compressive forces in the region of the outer surface 44 between location D-F (at about F) in the transition region 26 where the degree of taper sharply decreases from about 0.0034 in 0.005 inches (0-6 in 1) to less than 0.0010 in 0.005 (0.2 in 1) cause a deformation (minor buckling) of the outer surface. The buckling appears centered at about location F where the degree of taper drops below 0.0020 in 0.005 inches (2 in 5) and the width of the hook profile decreases to approximately equal the substantially constant thickness T (0.012 inches) of the hook 20. In this connection it should be noted that thickness T of the hook preferably exceeds the profile width in the area of loop engagement (i.e. between F and L) during tension operation in order to avoid undesired twisting or distortion normal to the profile shown in FIG. 6 which distortion inherently weakens the holding power of the hook. This is not as important in shear operation due to the sturdy monolithic nature of base 22 below the transition region. However, the thickness must be sufficient to avoid twisting in shear. The 0.012 inch thick- Table III following sets forth the advantageous performance of the hook of FIG. 6 by comparison with the standard hook of the prior art (as shown in FIGS. 1-5).

TABLE III

|  |  | Standard Hook (FIGS. 1-5) (0.070 hgt.) (Nylon 66) | FIG. 6 Hook (Elastomeric nylon) | FIG. 6 Hook (Stiff Nylon) | FIG. 6 Hook (Elastomeric polypropylene) |
| --- | --- | --- | --- | --- | --- |
| PEEL | (pounds/inch of width | 0.96 ± .17 (1.02-1.21) | .97 ± .37 | 2.80 ± .81 | .87 ± .34 |
| SHEAR | (pounds/sq. inch) | 12.5 ± 2.3 | 20.5 ± 4.8 | 50.5 ± 15.9 | 21.4 ± 4.2 |
| TENSION | (pounds/sq. inch) | 7.0 ± 3.0 | 11.7 ± 1.4 | 22.8 ± 9.1 | 11.6 ± 3.6 |
| STIFFNESS (dry) | (bending length (cm) | 13.3 ± .3 | 10.3 ± .2 | ? | 14.8 ± .1 |
| STIFFNESS (65% rh) | (bending length (cm) | 10.6 ± .2 | 10.6 ± .3 | 12.7 ± .1 | 15.5 ± .2 |
| TENSILE STRENGTH | (pounds/inch of width) | 158 ± 10 | 96 ± 26 | 114 ± 10 | 54 ± 2 |
| ELONGATION TO BREAK | (% of original length) | 33 ± 5 | 102 ± 46 | 47% ± 12 | 125% ± 38 |
| TEAR STRENGTH (md) ELMENDORF METHOD | (grams) | 1472 ± 87 | 227 ± 18 | 317 ± 26 | 163 ± 10 |
| TEAR STRENGTH (cd) | (grams) | does not tear | 2240 ± 363 | 1258 ± 60 | 578 ± 59 |
| SEWN SEAM STRENGTH | (pounds/inch of seam) | thread break | thread break | thread break | 14 ± 2 | ness of the hook of FIG. 6 has been found satisfactory in this respect. The inner concave face 42 is preferably so shaped as to bring a loop engaging hook 20 in shear to a position of engagement with the hook at about location E, so that the shear force is transmitted through the steeply tapered base below the location F of buckling under tension loading.

In FIG. 18 the tension force applied by the loop 52 is close to resiliently distorting the hook portion 28 sufficiently to release the loop as would happen as the hook and loop fastener parts are peeled apart. The buckling here is more pronounced and remains at about location F and the sturdy base remains substantially without deformation.

FIG. 19 shows a loop 52 engaging hook 20 and applying a load similar in magnitude to that applied in FIG. 17 but at an angle of about 30° to a direction normal to the base member. In this case a component of this load stresses the hook in shear. However, the primary load stresses hook 20 in tension as in FIG. 17. Again, a minor buckling is occurring at about location F.

FIG. 20 shows a highly stressed form of FIG. 19 just short of that needed to release the loop as a result of resilient distortion of the hook portion 28 under the applied load. As in FIG. 18 a substantial buckling is occurring at about location F.

FIG. 21 shows a highly stressed loading of hook 20, substantially only in shear, by loop 52. Because of the shape of the inner face 42 of the hook 20 the loop 52 engages the hook 20 at or below location E, and the pull of the loop it engages the hook for operation at or substantially in shear provides a force which intersects the hook in the region between the buckle point and the base member. As this transmission of force is through the sturdy monolithic (very strong) base of the hook below the location of buckling, great fastening strength is achieved in shear. In fact, this strength is so high that loop breakage can occur before the hook fails and the base member 24 can be seen to distort before significant hook distortion occurs.

FIG. 22 shows a variation of the hook of FIG. 6. In this case, the angle 34 of the center of area axis 24 is about 30° to the line 36 normal to the plane of base member 24 and the taper of the base and transition region of the hook is such that the inner face 42 is sloped in the same direction as axis 24 thereby to provide a positive component 56 of force urging a loop, engaging the hook in shear, toward the base member 24 to ensure maximum shear strength while retaining the peelable non-destruction loop and hook operation in tension. An inner face angle of at least about 10° to line 36 is appropriate and about −13° is preferred in the case of hooks made of Nylon and about 16° in the case of hooks made of polypropylene. An upper limit of about 20° may be necessary to meet other criteria of the design of the hook as set forth herein.

FIG. 23 shows a portion of base member 24 with a plurality of hooks 20 formed thereon. In this embodiment all hooks face in the same direction providing in shear engagement with loops, only in one direction. In the opposite direction the loops slide freely up the outer face 44 of the hooks and do not engage the hooks. This provides great strength in shear in one direction and ready separation on shear in the opposite direction. In this arrangement the operation of the hook and loop fastener in tension remains substantially normal. Of course, the hooks may have differing orientations to provide multi-directional shear operation coupled with normal tension operation.

FIG. 24 shows another preferred embodiment of the invention wherein a hook and loop fastener is shown having separate hook and loop assemblies. The hook assembly includes a number of hooks 20 extending from an integral planar base of the type generally described previously. As noted, these hooks are generally smoothly tapered from a sturdy base portion to a tip portion 28. A multiplicity of the hooks are aligned in a given direction so that adjacent hooks constitute a pair. The tip portion 28 of each hook extends in the given direction and faces a rear inclined surface 44 of the front hook in its pair. The curved tip portion 28 and the inclined surface 44 define a wedge-shaped opening having at the top, as illustrated, a maximum width and having a minimum width at the closest point between the front of the tip portion 28 and the adjacent rear surface 44 of the front hook. The cooperating loop assembly comprises a planar base 48 carrying a plurality of hooks 50. In FIG. 24 the plurality of the loop assemblies are shown and the cooperation between the wedge-shaped opening and a plurality of loops carried by the loop assembly is illustrated. As the loop assembly is forced downwardly towards the hook assembly a group of loops is forced through the wedge-shaped opening defined between a pair of hook elements. In the left hand side of FIG. 24 the loop assembly is just approaching the wedge. The next loop assembly is just entering the maximum width of the wedge-shaped opening. In the next portion of FIG. 24 the loop assembly has passed through the minimum width of the wedge-shaped opening and the rear loops have been forced, by the front loop which is still in engagement with the inclined surface 44, to travel under the tip of the rear hook. In the last portion of FIG. 24 the support for the loop assembly has been moved away from the hook assembly and the last three loops are shown as being held by the tip portion 28 of the rear hook.

As will be appreciated, with this construction there is a forcible positioning of the loops as they are brought into contact with the hook element, which assures engagement of the hook by the loops. For example, if one examines FIG. 24 and imagines that the right hand hook of a pair is not present and the loop assembly is pushed downward in contact with the hook assembly it would, at most, provide engagement of one and possibly two loops. In this case there would be no lateral force tending to push even the second loop under the tip of the hook. In fact, the force would be away from the tip rather than towards it.

While in the specific embodiment shown in FIG. 24 a number of loops (5 in this case) are illustrated, greater or lesser numbers can be employed. For example, there may be certain situations where particularly strong loops are required. For example, in those situations where the hook and loop fastener constitutes a means for connecting structural elements together. In this case, perhaps only two loops might pass through minimum width of the wedge. But even in this case the inclined surface o the front hook will tend to force both hooks under the tip of the adjacent rear hook. And even if the front loop does not engage the hook, the back loop will be forced under the hook portion and will be positively engaged thereby.

As will be appreciated, the unique cooperative relationship between the front and back surfaces of the two hooks of a pair provide a novel structure of closely spaced hooks and provides a novel method of assuring engagement by the loop assembly of the hook and loop fastener.

The close relationship of the hooks and their smooth curved upper surface also have additional advantages. With the high density of hooks, which can be as high as 750 hooks per square inch compared with about 300 from prior art woven constructions, the hook assembly provides a surface which, while undulating feels smooth to the touch and does not have protruding sharp ends and is relatively incompressible compared to woven constructions. The type of construction illustrated in FIG. 24 gives greatly improved non-snagging characteristics and greatly reduces lint pick-up in use during washing. It also has the characteristic of very low abrasion by the hooks against adjacent textile surfaces. With this type of hook assembly, the loops are readily and positively engaged, as described above, but other fibers are only poorly engaged by the hooks.

In FIG. 24 the tips of the hooks all extend in the same direction. This will provide, as mentioned previously, high shear when the loops are moved to the left as shown in FIG. 24. In order to get multidirectional shear operation an adjacent line of hooks can extend in the opposite direction. Thus one line of hooks will give high shear when the loops are pulled in one direction and the adjacent lines of hooks will give high shear strength when the loops are pulled in the opposite direction.

As will be noted from FIG. 24 the maximum width of the wedge is about twice the minimum width of the wedge. This relation is not critical. The important feature is that there be sufficient pressure on the front loop so that it forces all of the rear loops to move away from the front hook and towards and under the tip of the rear hook as the loops pass through the narrow portion of the wedge. The precise number of loops which are forced under the tip will depend upon the density of loops and the actual spacings involved. The important feature is that there be a high enough density of loops so that the front loop will exert a rearward force on the back loop o& a group passing through the smallest portion of the wedge-shaped opening.

While the present invention has been described with particular reference to the individual molding of each hook on a common base member, it will be appreciated that the beneficial performance of the present invention can be achieved using other manufacturing methods including producing an extrusion including the hook profiles in its transverse cross-section, the hooks subsequently being formed by removing transverse hook-shaped portions of the extrusion as, for example, by machining.

We claim:

1. An improved hook for hook and loop fasteners having a profile defined by an inner generally concave face and an outer generally convex face, said hook comprising a planar base member intimately engaging a tapered base portion and extending therefrom to join, in a transition region, a tapered hook portion able to engage a loop applying a force to the hook portion substantially normal to the planar base member and terminating in a free end, the taper on the hook portion being much less than the taper on the base portion wherein the hook tapers continuously downwardly in width from the tapered base portion to the free end such that a loop engaging the hook in tension, with the said force being substantially normal to the planar base member, will cause a hinging or buckling of the hook at a location adjacent the outer face in the transition region as the hook deforms under the applied force and such that a loop engaging the hook in shear, with said force substantially parallel to the planar base member, will transmit bending force through the tapered base portion between the location of buckling and the planar base member, the hook being of substantially constant thickness and having a substantially rectangular transverse cross-section, said taper being from about 0.6 in 1 to about 0.2 in 1 in the transition region at about the buckling location.

2. An improved hook according to claim 1 wherein the hook has a width substantially equal to its thickness at about the location of buckling.

3. An improved hook according to claim 2 wherein the inner face in the transition region has an angle of at least about 10° to the direction normal to the base member oriented to encourage a loop engaging said hook in shear to move toward said base member.

4. An improved hook according to claim 3 wherein said inner face angle is at least about 13°.

5. An improved hook according to claim 4 made of Nylon wherein said inner face angle is about 13°.

6. An improved hook according to claim 4 made of Polypropylene wherein said inner face angle is about 16°.

7. An improved hook according to claim 1 wherein the hook defines a center of area axis angle in the base and transition region, at an angle of about 15° to about 35° to a direction normal to the base member whereby said axis slopes toward the hook portion as it extends away from the base member.

8. An improved hook according to claim 7 wherein said axis angle is from about 17.5° to about 30°.

9. An improved hook according to claim 8 wherein said axis angle is about 17.5°.

10. An improved hook according to claim 1 wherein hook thickness is about 0.012 inches, hook height is about 0.050 inches±0.002 inches and the hook width tapers from about 0.025 inches adjacent the base member to about 0.006 inches adjacent the free end.

11. An improved hook according to claim 1 wherein the inner generally concave force is so shaped as to encourage a loop engaging the hook in shear to engage the hook at about the location of buckling.

12. An improved hook for hook and loop fasteners having a profile defined by an inner smoothly contoured generally concave face and an outer generally convex face, said hook comprising a sturdy base intimately engaging a substantially planar base portion member and extending therefrom with a relatively large taper to join a resilient hook portion, able to engage a loop applying a force to the hook portion substantially normal to the base member, terminating in a free end, wherein the hook tapers slightly, smoothly and continuously downwardly in width from the base member to the free end, the front to rear width of the hook portion where it the hook portion joins the base portion being about equal to its transverse thickness, whereby a loop engaging the hook in tension, with the applied force being substantially normal to the base member, will deform the hook portion resiliently under the applied force to release the loop at a desired applied force and such that a loop engaging the hook in shear, with the applied force substantially parallel to the base member, will engage the sturdy base member, the sturdy base member being sharply tapered and sufficiently sturdy that it will not deform to release a loop engaging the hook in a shear at or below the desired applied force, the effective taper of the base portion as measured between its inner and outer faces being at least 25°, said taper being from about 0.6 in 1 to about 0.2 in 1 at the transition from the sturdy base to the hook portion.

13. An improved hook according to claim 12 wherein the hook defines a center of area axis angled in the base, at an angle of about 15° to about 35° in a direction normal to the base member whereby said axis slopes toward the hook portion as the axis extends away from the base member.

14. An improved hook according to claim 13 wherein said the axis angle is from about 17.5° to about 30°.

15. An improved hook according to claim 14 wherein said the axis angle is about 17.5°.

16. An improved hook according to claim 12 wherein the inner face in the transition region has an angle of at least 10° to about 20° to a direction normal to the base member oriented to encourage a loop engaging said hook in shear to move toward said base member.

17. An improved hook according to claim 16 made of Nylon wherein said inner face angle is about 13°.

18. An improved hook according to claim 16 made of Polypropylene wherein said inner face angle is about 16°.

19. An improved hook according to claim 16 wherein said inner face angle is about 13°.

20. An improved hook according to claim 12 wherein said axis angle is at least about 30°.

21. An improved hook according to claim 12 wherein said taper is about 0.4 in 1 at transition between the point 6 to 1 taper to the 0.2 to 1 taper.

22. An improved hook according to claim 12 wherein hook thickness is about 0.012 inches, hook height is about 0.050 inches+/−0.002 inches and the hook width tapers from about 0.026 inches adjacent the base member to about 0.006 inches adjacent the free end of the hooks.

23. An improved hook according to claim 12 wherein the sturdy base is sufficiently sturdy that the base member deforms before the sturdy base deforms under an applied load applied in shear to the sturdy base by a loop.

24. A hook and loop fastener comprising separate hook and loop assemblies, each hook assembly comprising a number of hooks according to claim 12 extending from an integral planar base, a multiplicity of said hooks being aligned in a given direction so that adjacent hooks constitute a pair, with a front hook and a rear hook in each pair, the tip portion of each hook extending in the given direction, each hook being inclined from the integral base in the given direction, the front hook in a pair having a rear source which is inclined in the given direction and forms a wedge-shaped opening with a front surface of the tip portion of the rear hook, said wedge-shaped opening having predetermined minimum and maximum widths as measured in said given direction, said loop assembly having a plurality of loops extending from a planar support thereof, there being a sufficient density of loops that more than two loops are present on a length of support measured in said given direction which is equal to said maximum width, said minimum width being large enough to permit at least two of said loops to pass therethrough simultaneously, whereby forcible movement of said loop assembly into engagement with said hook assembly will compress a group of loops together as they enter the wedge-shaped opening and all of the group of loops will be forced toward the rear hook as the loops pass through the minimum wedge width and the rear loop in the group will be forced by the front loop, which is still under pressure from the inclined rear surface of the front hook, to travel under the tip portion of the rear hook to be engaged thereby.

25. The hook and loop assembly of claim 24 wherein a number of rows of said hooks are provided and wherein different rows have hooks which are aligned in directions which are different from one row to another to provide high resistance to shear in more than one direction.

26. An improved hook assembly according to claim 24, wherein said hooks each have an inner generally concave face which is textured to exchange frictional engagement of the said hook with a cooperating loop.

27. An improved hook assembly comprising a plurality of rows of the hooks of claim 12, with all of the hook portions extending in the same direction, wherein said assembly has high shear resistance in one direction and low shear resistance in the opposite direction.

28. An improved hook according to claim 12, wherein said inner generally concave face is textured to enhance frictional engagement of the hook with a cooperating loop.

* * * * *

UNITED STATES PATENT AND TRADEMARK OFFICE
CERTIFICATE OF CORRECTION

PATENT NO. : 4,984,339

DATED : January 15, 1991

INVENTOR(S) : Provost et al.

It is certified that error appears in the above-identified patent and that said Letters Patent is hereby corrected as shown below:

Claim 3, col. 11, line 6, "the" (first occurrence) should be "a".

Claim 10, col. 11, line 29, "0.025" should be "0.026".

Claim 12, col. 11, line 47, delete "it".

Claim 13, col. 11, line 65, "in" should be "to".

Claim 14, col. 12, line 2, delete "the".

Claim 15, col. 12, line 4, delete "the".

Claim 16, col. 12, line 7, after "least" insert "about".

Claim 24, col. 12, line 43, "source" should be "surface"; and
line 49, "thereof" should be "therefor".

Claim 27, col. 14, line 1, "wherein" should be "whereby".

Signed and Sealed this

Eleventh Day of August, 1992

*Attest:*

DOUGLAS B. COMER

*Attesting Officer*  *Acting Commissioner of Patents and Trademarks*